United States Patent
Yu et al.

(10) Patent No.: US 12,194,445 B2
(45) Date of Patent: Jan. 14, 2025

(54) MODIFIED β ZEOLITE, CATALYTIC CRACKING CATALYST AND THEIR PREPARATION METHOD AND APPLICATION

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Shanqing Yu, Beijing (CN); Jiasong Yan, Beijing (CN); Jiexiao Zhang, Beijing (CN); Liwen Tang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 153 days.

(21) Appl. No.: 17/997,632

(22) PCT Filed: Apr. 29, 2021

(86) PCT No.: PCT/CN2021/090881
§ 371 (c)(1),
(2) Date: Oct. 31, 2022

(87) PCT Pub. No.: WO2021/219064
PCT Pub. Date: Nov. 4, 2021

(65) Prior Publication Data
US 2023/0166245 A1    Jun. 1, 2023

(30) Foreign Application Priority Data

Apr. 30, 2020   (CN) .......................... 202010367845.X

(51) Int. Cl.
| | |
|---|---|
| B01J 29/80 | (2006.01) |
| B01J 21/12 | (2006.01) |
| B01J 21/16 | (2006.01) |
| B01J 29/08 | (2006.01) |
| B01J 29/70 | (2006.01) |
| B01J 37/00 | (2006.01) |
| B01J 37/04 | (2006.01) |
| B01J 37/08 | (2006.01) |
| C10G 11/05 | (2006.01) |
| B01J 29/06 | (2006.01) |

(52) U.S. Cl.
CPC .............. *B01J 29/80* (2013.01); *B01J 21/12* (2013.01); *B01J 21/16* (2013.01); *B01J 29/084* (2013.01); *B01J 29/7057* (2013.01); *B01J 37/0018* (2013.01); *B01J 37/04* (2013.01); *B01J 37/088* (2013.01); *C10G 11/05* (2013.01); *B01J 2029/062* (2013.01); *B01J 2229/186* (2013.01); *B01J 2229/42* (2013.01); *C10G 2300/202* (2013.01); *C10G 2300/205* (2013.01); *C10G 2300/206* (2013.01); *C10G 2300/301* (2013.01); *C10G 2300/308* (2013.01); *C10G 2400/02* (2013.01); *C10G 2400/20* (2013.01)

(58) Field of Classification Search
CPC ..... B01J 29/80; B01J 29/7057; B01J 29/7007
See application file for complete search history.

(56) References Cited

U.S. PATENT DOCUMENTS

| | | | |
|---|---|---|---|
| 3,758,403 | A | 9/1973 | Rosinski et al. |
| 4,837,396 | A | 6/1989 | Herbst et al. |
| 5,243,121 | A | 9/1993 | Madon et al. |
| 10,596,557 | B2 | 3/2020 | Sun et al. |
| 2005/0153829 | A1 | 7/2005 | Nemeth et al. |

FOREIGN PATENT DOCUMENTS

| | | |
|---|---|---|
| CN | 1055105 C | 10/1991 |
| CN | 1179994 A | 4/1998 |
| CN | 1768942 A | 5/2006 |
| CN | 103771437 A | 5/2014 |
| CN | 104549453 A | 4/2015 |
| CN | 104998681 A | 10/2015 |
| CN | 105621432 A | 6/2016 |
| CN | 106140256 A | 11/2016 |
| CN | 106140277 A | 11/2016 |

(Continued)

OTHER PUBLICATIONS

English machine translation of CN106140289 (Year: 2016).*
English machine translation of CN107973307 (Year: 2018).*
Puche Panadero, Marta et al.; "Readily available Ti-beta as an efficient catalyst for greener and sustainable production of campholenic aldehyde", Catalysis Science & Technology, vol. 9, No. 16, Aug. 12, 2019, pp. 4293-4303.

(Continued)

*Primary Examiner* — Renee Robinson
(74) *Attorney, Agent, or Firm* — NKL Law; Allen Xue

(57) ABSTRACT

A modified β zeolite has 0.5-15 wt % of an IVB group metal element in terms of oxide on the dry basis weight of the modified β zeolite. The number of medium strong acid centers of the modified β zeolite accounts for 30-60% of the total acid amount, the number of strong acid centers accounts for 5-25% of the total acid amount, and the ratio of B acid to L acid is 0.8 or more. The ratio of the weight content of the IVB group metal element in the modified β zeolite body phase to the weight content of the IVB group metal element on the surface is 0.1-0.8. The catalytic cracking catalyst containing the modified β zeolite has good selectivity and yield of C4 olefin.

18 Claims, No Drawings

(56) References Cited

FOREIGN PATENT DOCUMENTS

| CN | 106140289 | A |   | 11/2016 |           |
|----|-----------|---|---|---------|-----------|
| CN | 106140290 | A |   | 11/2016 |           |
| CN | 106145154 | A |   | 11/2016 |           |
| CN | 104549463 | B |   | 1/2017  |           |
| CN | 107899607 | A |   | 4/2018  |           |
| CN | 107971000 | A |   | 5/2018  |           |
| CN | 107971003 | A |   | 5/2018  |           |
| CN | 107973307 | A | * | 5/2018  | B01J 29/7215 |

OTHER PUBLICATIONS

Paniagua, Marta et al.: "Understanding the role of Al/Zr ratio in Zr-Al.Beta zeolite: Towards the one-pot production of GVL from glucose", Catalysis Today, vol. 367, Apr. 15, 2020, pp. 228-238.

* cited by examiner

MODIFIED β ZEOLITE, CATALYTIC CRACKING CATALYST AND THEIR PREPARATION METHOD AND APPLICATION

TECHNICAL FIELD

The present invention relates to a modified β zeolite, a catalytic cracking catalyst, and their preparation method and application.

BACKGROUND TECHNOLOGY

With the enhancement of environmental awareness, the quality standard of the vehicle gasoline is constantly upgraded. The new standard for the vehicle gasoline and GB17930-2016 clearly stipulate that the national VI standard gasoline will be implemented nationwide in phases from 2019. Compared with the national V standard, the contents of benzene, aromatics and olefin of gasoline under the national VI standard will be reduced. At present, the scheme of concoction components of gasoline in China can hardly meet the requirements. Due to the high octane number and the zero content of olefins, aromatics and benzene, alkylated gasoline is a good gasoline concoction component compared with the traditional catalytic gasoline and the reformed gasoline under the national VI standard, and its proportion in the gasoline concoction components will be greatly increased. The main raw materials of an alkylation unit are isobutane and C4 olefins. Nearly 70% of the world's C4 olefins come from catalytic cracking units, and the technology of producing C4 olefin fractions from catalytic cracking units has the advantages of less investment and low cost. Many companies try to obtain a higher yield of C4 olefins from catalytic cracking processes.

Shape selective molecular sieves are usually added to catalysts in order to increase the production of low-carbon olefins. In 1993, Engelhard CORP. from the U.S. disclosed for the first time in the U.S. patent U.S. Pat. No. 5,243,121 a catalytic cracking catalyst that increases the production of isobutylene and isoamylene. Lowering the unit cell size of a Y zeolite in a cracking catalyst via a hydrothermal treatment gives a catalyst which may enhance the olefin selectivity of the product during the cracking of hydrocarbons. Addition of a certain amount of ZSM-5 zeolite as an adjuvant to the catalyst may result in a decrease in coke yield and an increase in activity. U.S. Pat. No. 3,758,403 discloses a catalyst with ZSM-5 and large pore size zeolites (mainly Y type zeolites) as the active components, which results in an increased octane number and in increased yields of C3 and C4 olefins, wherein, large pore size zeolites crack the raw material to generate gasoline and diesel. ZSM-5 shape selective molecular sieve further cracks it into low-carbon olefins.

β zeolite was synthesized for the first time by Wadlinger et al. from Mobil in 1967. By 1988, Higgins et al. revealed its unique three-dimensional structural characteristics. It is the only high silica zeolite with a cross 12-ring channel system. The one-dimensional 12-ring channel parallel to the (001) crystal plane has a diameter of 0.75~0.57 nm, and another two-dimensional 12-ring channel parallel to the (100) crystal plane has a diameter of 0.65~0.56 nm. Due to its special structure, it has both an acid catalytic property and a structural selectivity, and has rapidly developed into a novel catalytic material in recent years. The main problems in the use of β zeolite are: on the one hand, its structure is easy to be damaged in the process of removing the templating agent, and on the other hand, it is easy to dealuminate in the reaction process, which worsens the activity stability. Therefore, there are many research reports on the modification of β zeolite.

CN103771437A discloses a phosphorus-containing modified β-molecular sieve. The content of phosphorus accounts for 3-10 wt %, calculated as $P_2O_5$, and in the $^{27}Al$ MAS NMR of the molecular sieve, the ratio of a resonance signal peak area with the chemical shift of 40±3 ppm to a resonance signal peak area with the chemical shift of 54 ppm±3 ppm is not less than 1. In the molecular sieve, phosphorus is in a full coordination with the framework aluminum, the framework aluminum is fully protected, and it has an excellent hydrothermal stability and a better product selectivity.

CN1179994A discloses a β zeolite modification method. Na β zeolite passes through ammonium ion exchange to make the content of $Na_2O$ on the zeolite less than 0.1 wt %; then, the above ammonium exchanged β zeolite is treated with acid, and a part of the framework aluminum is removed to make its silica-alumina ratio greater than 50; the above dealuminized β zeolite is mixed with phosphoric acid or phosphate uniformly, and dried so as to make the $P_2O_5$ content on the obtained zeolite be 2-5 wt %; at last, under an aqueous vapor atmosphere, the product obtained is hydrothermally calcined for 0.5-4 hr at 450-650° C. When the β zeolite modified according to this method is used in a hydrocarbon cracking reaction, it can result in a higher yield of olefins, in particular isoolefine, and a lower yield of coke.

CN105621432A discloses a modified β molecular sieve and the preparation method thereof. The β molecular sieve obtained after ammonium exchange is subjected to pretreatment and drying; a charcoal-deposition reaction is carried out; a high-temperature calcination treatment is carried out; then it is subjected to a dealumination treatment, drying and a charcoal burning treatment, to give a modified β molecular sieve. The silicon aluminum ratio of the modified β molecular sieve body phase is 30-80, wherein, the silica alumina ratio of the surface layer is 50-130, and the silica alumina ratio of the surface layer is higher than that of the body phase by 30-70. The specific surface area is 400-800 m²/g, the pore volume is 0.2-0.60 ml/g; the infrared acid content is 0.1-0.6 mmol/g; the relative crystallinity is 100%-150%. The silica alumina ratio of the molecular sieve surface layer of the present invention is higher than the silica alumina ratio of the body phase, and has a broad application prospect in the hydrocracking reaction process.

CN107899607A provides a modified β molecular sieve, a preparation method and an application of molecular sieve. The preparation method of the catalyst includes: taking the β molecular sieve as a substrate; taking metal elements as modifying agents; preparing the modified β molecular sieve using a soluble salt solution of the metal elements and an ion exchange method. The metal element is selected form one of Cu, Al, Zn, Fe and Sn or a mixture of more than one of them, and accounts for 0.5-4% of the mass of the prepared modified β molecular sieve.

There are also many reports on the application of β zeolite in a catalytic cracking catalyst to produce low-carbon olefins. U.S. patent U.S. Pat. No. 4,837,396 discloses a catalyst comprising β zeolite and Y zeolite. Metal ion-containing compounds are used as stabilizers to improve the hydrothermal stability and the mechanical strength of the catalyst. The stabilizers can directly act on the β zeolite or be introduced in the preparation process.

CN1055105C discloses a cracking catalyst for a high yield of isobutene and isopentene, comprising 6-30 wt % of phosphorus and rare earth-containing high-Si zeolite with a five-membered ring, 5-20 wt % of USY zeolite, 1-5 wt % of β zeolite, 30-60 wt % of clay and 15-30 wt % of inorganic oxide. The catalyst has the characteristics of a high yield of isobutene and isopentene under the process conditions of catalytic cracking, and can simultaneously co-produce high octane gasoline.

CN107971003A discloses a catalytic cracking aid including Beta molecular sieve containing phosphorus and a loading metal, and a preparation method thereof. The aid comprises 10 to 75 wt % of the Beta molecular sieve containing phosphorus and a loading metal in terms of a dry basis, 0 to 60 wt % of clay in terms of a dry basis, 15 to 60 wt % of an inorganic oxide binder in terms of a dry basis, 0 to 25 wt % of a phosphorus additive in terms of $P_2O_5$ and 0 to 15 wt % of a Group-VIII metal additive in term of oxide, wherein the distribution parameter D of Al in the molecular sieve is 0.4≤D≤0.8; the micropore specific area of the molecular sieve is 420 to 520 $m^2/g$; the mesopore volume of the molecular sieve accounts for 30 to 70% of the total pore volume; the amount of strong acids in the molecular sieve accounts for 65 to 80% of the total acid amount; and a ratio of the amount of the acid B to the amount of the acid L is 25 to 90. The aid can improve the yield of isobutene and propylene and the octane number of gasoline when applied to a catalytic cracking.

However, the increase of the total butene concentration in the liquefied gas is not significant. CN104998681A discloses a catalytic cracking assistant for improving the concentration of low-carbon olefins, and a preparation method thereof. The assistant comprises a boron modified beta molecular sieve containing phosphorus and metals, an inorganic oxide adhesive, a VIII group metal additive, a phosphorus additive and an optional clay. The catalytic cracking assistant is applied in a catalytic cracking of petroleum hydrocarbons, and can increase the concentration of isobutene in the catalytic cracking liquefied gas and reduce the yield of coke.

CN107971000A discloses a catalytic cracking auxiliary agent containing phosphorus-containing Beta molecular sieve, and a preparation method thereof. The auxiliary agent contains 10-75 wt % of a phosphorus-containing Beta molecular sieve on the dry basis, 0-60 wt % of clay on the dry basis, 15-60 wt % of an inorganic oxide binder on the dry basis, 0-25 wt % of a phosphorus additive based on $P_2O_5$, and 0-15 wt % of a VIII group metal additive based on the oxide. The yields of isobutylene and propylene can be improved, and the octane number of gasoline can be improved when the auxiliary agent is applied in the catalytic cracking.

The object of increasing the yield of low-carbon olefins can be achieved to a certain extent in the process of using the various catalysts/adjuvants/aids/assistants prepared according to the above technologies in a catalytic cracking, but there are also the following problems: one is that with the increase of propylene and butylene, the yield of liquefied gas also increases, resulting in little change in the concentration of propylene or butylene in the liquefied gas; on the other hand, with the increase of butylene, the yield of propylene also increases, resulting in a worse selectivity to butylene.

According to the analysis of the formation and conversion mechanism of C4 olefins in the catalytic cracking process, the formation of C4 olefins in the catalytic cracking process mainly comes from two aspects: one is the product from cracking of the active intermediates generated from the hydrocarbon macromolecules in the feedstock through a single molecule cracking reaction or a double molecule cracking reaction, and the other is the product of the secondary reaction of the low-carbon olefins formed in the cracking reaction. The C4 olefins generated during the catalytic cracking can further undergo a cracking reaction, an isomerization reaction, a dimerization reaction and a hydrogen transfer reaction.

SUMMARY OF THE INVENTION

An object of the present invention is to provide a modified β zeolite, a catalytic cracking catalyst, and their preparation method and application. The catalytic cracking catalyst of the present invention has good selectivity and yield of C4 olefins.

In order to achieve the above object, the present invention provides, in the first aspect, a modified β zeolite, comprising 0.5-15 wt % of an IVB group metal element in terms of oxide on a dry basis weight of the modified β zeolite. The number of medium strong acid centers of the modified β zeolite accounts for 30-60% of the total acid amount, the number of strong acid centers accounts for 5-25% of the total acid amount, and the ratio of B acid to L acid is 0.8 or more. The ratio of the weight content of the IVB group metal element in the modified β zeolite body phase to the weight content of the IVB group metal element on the surface is 0.1-0.8.

Optionally, the ratio of the B acid to the L acid is 1.0-1.5.
Optionally, the number of medium strong acid centers accounts for 35-55% of the total acid amount.
Optionally, the number of strong acid centers accounts for 5-20% of the total acid amount.
Optionally, the modified β zeolite comprises 1-12 wt % of the IVB group metal element in terms of oxide on the dry basis weight of the modified β zeolite.
Optionally, the IVB group metal element is Zr and/or Ti, preferably Zr, wherein the weight of the Zr element is based on $ZrO_2$, and the weight of the Ti element is based on $TiO_2$.
Optionally, the ratio of the weight content of the IVB group metal element in the modified β zeolite body phase to the weight content of the IVB group metal element on the surface is 0.1-0.6.

The present invention provides, in the second aspect, a catalytic cracking catalyst comprising 10-50 wt %, preferably 20-50 wt %, of Y-type zeolite, 2-40 wt % of a modified β zeolite, 10-70 wt % of clay, and 5-60 wt % of a heat-resistant inorganic oxide on the dry basis weight of the catalytic cracking catalyst, wherein the modified β zeolite is the modified β zeolite provided in the first aspect of the present invention.

Optionally, the Y-type zeolite is selected from one or more of a Y-type zeolite containing phosphorus and/or rare earth, an ultrastable Y zeolite and an ultrastable Y zeolite containing phosphorus and/or rare earth;
Optionally, the clay is selected from one or more of kaolin, rectorite, diatomite, montmorillonite, bentonite and sepiolite;
Optionally, the heat-resistant inorganic oxide is selected from one or more of aluminum oxide, silicon oxide and amorphous silicon aluminum.
Optionally, the catalytic cracking catalyst comprises 15-45 wt %, preferably 30-45 wt % of the Y-type zeolite, 5-30 wt % of the modified β zeolite, 10-50 wt % of the clay and 5-40 wt % of the heat-resistant inorganic oxide.

The present invention provides, in the third aspect, a method for preparing the modified β zeolite provided in the first aspect of the present invention. The method comprises:

(1) mixing a compound containing an IVB group metal, a carbon source and a first solvent, adjusting a pH value of the mixture to 4-9 to give a first slurry, wherein the carbon source comprises a native macromolecular organic compound and/or a semi-synthetic macromolecular organic compound;

(2) mixing the first slurry and a β zeolite by stirring at 20-100° C. for 10-180 min, and taking out a solid for a first calcination at 350-650° C. for 0.5-5 hr.

Optionally, in step (2), the pH value of the first slurry is adjusted to 5-8.

Optionally, the weight ratio of the amount of the compound containing an IVB group metal and the amount of the β zeolite is (0.005-0.15):1, and the weight ratio of the amount of the β zeolite and the amount of the carbon source is 1:(0.001-0.15), wherein the compound containing an IVB group metal is based on the oxide of the IVB group metal, and the β zeolite is on the dry basis.

Optionally, the β zeolite is selected from one or more of hydrogen type β zeolite, sodium type β zeolite, β zeolite containing phosphorous, β zeolite containing a rare earth metal and β zeolite containing phosphorus and a rare earth metal.

Optionally, the carbon source is selected from one or more of starch, lignin, viscose fiber, methyl cellulose, hydroxypropyl methyl cellulose, hydroxyethyl cellulose and carboxymethyl cellulose.

Optionally, the compound containing an IVB group metal is selected from one or more of zirconium tetrachloride, zirconium acetate, zirconium isopropoxide, titanium tetrachloride, titanium oxysulfate, ammonium fluotitanate, zirconium sulfate, zirconium nitrate, zirconium oxychloride, titanium sulfate, tetrabutyl titanate, titanium trichloride and titanous sulfate.

Optionally, the first solvent is selected from one or more of deionized water, ethanol, acetone and n-hexane.

The present invention provides, in the fourth aspect, a method for preparing the catalytic cracking catalyst provided in the second aspect of the present invention. The method comprises: mixing the Y-type zeolite, the modified β zeolite provided in the first aspect of the present invention, the clay, the heat-resistant inorganic oxide and a second solvent to give a second slurry, granulating the second slurry obtained, and carrying out drying and/or a second calcination.

Optionally, the drying temperature is 80-200° C., and the drying time is 0.5-24 hr; The temperature of the second calcination is 350-700° C., and the time is 0.5-5 hr.

The present invention provides, in the fifth aspect, an application of the modified β zeolite provided in the first aspect of the present invention or the catalytic cracking catalyst provided in the second aspect of the present invention in the catalytic cracking of heavy oils.

Through the above technical solutions, the modified β zeolite of the present invention has excellent acid distribution and IVB group metal distribution, and the catalytic cracking catalysts that contain this modified β zeolite have a good catalytic performance. When it is used in the catalytic cracking process of heavy oils, the heavy oil has an excellent cracking performance. It can increase the concentration of C4 olefins in the liquefied gas and increase the yield and selectivity of C4 olefins without reducing the yield of gasoline and liquefied gas.

The method of the present invention is simple, and can improve the state and the amount of the IVB group metal oxide distributed on the β zeolite, adjust the channel distribution of the β zeolite, and enables the preparation of the modified β zeolite with good physical and chemical properties. Other features and advantages of the present invention will be described in detail in the following portion of specific embodiments.

SPECIFIC EMBODIMENTS

The specific embodiments of the present invention are described in detail below. It should be understood that the specific embodiments described here are only to demonstrate and explain the present invention rather than to limit the present invention.

The present invention provides, in the first aspect, a modified β zeolite, comprising 0.5-15 wt %, such as 2-13.5 wt %, of an IVB group metal element in terms of oxide on the dry basis weight of the modified β zeolite. The number of medium strong acid centers of the modified β zeolite accounts for 30-60%, such as 30-50%, of the total acid amount, the number of strong acid centers accounts for 5-25%, such as 10-25%, of the total acid amount, and the ratio of B acid to L acid is 0.8 or more, such as 0.9-1.5. The ratio of the weight content of the IVB group metal element in the modified β zeolite body phase to the weight content of the IVB group metal element on the surface is 0.1-0.8, such as 0.15-0.45.

Compared with the traditional β zeolite, the modified β zeolite of the present invention has excellent acid distribution and ratio of B acid to L acid, and the number of medium strong acid centers increases, which optimizes the ratio of the isomerization reaction to the cracking reaction for carbenium ion in the catalytic cracking reaction process, and is conducive to an isomerization reaction of the C6-C10 olefins generated in the catalytic cracking process prior to an β site cleavage reaction, increasing the selectivity of C4 olefins; Meanwhile, the modified β zeolite has an excellent ability of cracking heavy oils.

According to the present invention, the IVB group metal element can be Zr and/or Ti, preferably Zr, wherein the weight of Zr element is based on $ZrO_2$, and the weight of Ti element is based on $TiO_2$.

According to the present invention, the IVB group metal element on the surface of the β zeolite can be present in the form of the IVB group metal oxide. In a preferred specific embodiment, the IVB group metal oxide is $ZrO_2$ and/or $TiO_2$, more preferably $ZrO_2$.

In a preferred specific embodiment, the modified β zeolite comprises 1-12 wt %, such as 2-12 wt %, of the IVB group metal element in terms of oxide on the dry basis weight of the modified β zeolite.

The number of medium strong acid centers accounts for 35-55%, such as 35-50% or 35-45%, of the total acid amount, the number of strong acid centers accounts for 5-20%, such as 10-20%, of the total acid amount, and the ratio of B acid to L acid is 0.8 or more, such as 1.0-1.5 or 1.1-1.5. The ratio of the weight content of the IVB group metal element in the modified β zeolite body phase to the weight content of the IVB group metal element on the surface is 0.1-0.6, such as 0.15-0.45.

The present invention provides, in the second aspect, a catalytic cracking catalyst comprising 20-50 wt % of Y-type zeolite, 2-40 wt % of a modified β zeolite, 10-70 wt % of clay, and 5-60 wt % of a heat-resistant inorganic oxide on the dry basis weight of the catalytic cracking catalyst, wherein the modified β zeolite is the modified β zeolite provided in the first aspect of the present invention.

The inventor of the present invention found that the combination of Y zeolite and the modified β zeolite can promote the cracking process of heavy oil macromolecules, reduce the yields of oil slurry and diesel oil, increase the yield of gasoline, and provide more potential components for the increased production of C4 olefins, as well as further increase the selectivity of C4 olefins. When the catalytic cracking catalyst of the present invention is used in the catalytic cracking process of heavy oils, it can increase the concentration of C4 olefins in the liquefied gas and increase the yield and the selectivity of C4 olefins without reducing the yield of gasoline and liquefied gas.

In a preferred specific embodiment, the catalytic cracking catalyst comprises 30-45 wt % of the Y-type zeolite, 5-30 wt % of the modified β zeolite, 10-50 wt % of the clay and 5-40 wt % of the heat-resistant inorganic oxide.

According to the present invention, the heat-resistant inorganic oxide can be selected from the heat-resistant inorganic oxide used as the matrix and/or binder components of the catalytic cracking catalyst, such as one or more of aluminum oxide, silicon oxide and amorphous silicon aluminum.

These heat-resistant inorganic oxides themselves and their preparation methods are known to persons in the art.

According to the present invention, the Y-type zeolite and the clays are well-known to persons skilled in the art. For example, the Y-type zeolite can be selected from one or more of a Y-type zeolite containing phosphorus and/or rare earth, an ultrastable Y zeolite and an ultrastable Y zeolite containing phosphorus and/or rare earth; the clay can be selected from one or more of kaolin, rectorite, diatomite, montmorillonite, bentonite and sepiolite.

The present invention provides, in the third aspect, a method for preparing the modified β zeolite provided in the first aspect of the present invention. The method comprises:

(1) mixing a compound containing an IVB group metal, a carbon source and a first solvent, adjusting a pH value of the mixture to 4-9 to give a first slurry, wherein the carbon source comprises a native macromolecular organic compound and/or a semi-synthetic macromolecular organic compound;

(2) mixing the first slurry and a β zeolite by stirring at 20-100° C. for 10-180 min, and taking out a solid for a first calcination at 350-650° C. for 0.5-5 hr.

The atmosphere of the first calcination is not specifically limited, for example, it can be an air atmosphere and/or an inert atmosphere, wherein the inert gas in the inert atmosphere is selected from one or more of nitrogen, helium and argon. The temperature and time of the mixing carried out in step (1) are not specifically limited, for example, the mixing can be carried out at 40-90° C. for 30-120 min. The way of taking out the solid is not specifically limited, for example, a filtration or stoving method can be used, and a filtration method is preferred.

According to the present invention, the weight ratio of the amount of the compound containing an IVB group metal and the amount of the β zeolite can be (0.005-0.15):1, and the weight ratio of the amount of the β zeolite and the amount of the carbon source can be 1:(0.001-0.15), wherein the compound containing an IVB group metal is based on the oxide of the IVB group metal, and the β zeolite is on the dry basis weight. Preferably, the weight ratio of the amount of the compound containing an IVB group metal and the amount of the β zeolite is (0.01-0.12):1, and the weight ratio of the amount of the β zeolite and the amount of the carbon source is 1:(0.005-0.10). More preferably, the compound containing an IVB group metal is a compound containing Zr and/or a compound containing Ti.

According to the present invention, the carbon source can be a macromolecular organic compound, such as a native macromolecular compound and/or a semi-synthetic macromolecular compound. In a specific embodiment, the carbon source can be selected from one or more of starch, lignin, viscose fiber, methyl cellulose, hydroxypropyl methyl cellulose, hydroxyethyl cellulose and carboxymethyl cellulose. The weight content of the IVB group metal element on the surface of the modified β zeolite prepared from the above macromolecular organic compound and/or semi-synthetic macromolecular organic compound is higher than that of the IVB group metal element in the body phase. The modified β zeolite has a relatively excellent catalytic performance. When used in the catalytic cracking process of heavy oils, it can increase the concentration of C4 olefins in the liquefied gas and increase the yield and the selectivity of C4 olefins without reducing the yield of gasoline and liquefied gas.

According to the present invention, the IVB group metal in the compound containing an IVB group metal can be titanium and/or zirconium. In a specific embodiment, the compound containing an IVB group metal can be selected from one or more of zirconium tetrachloride, zirconium sulfate, zirconium nitrate, zirconium oxychloride, zirconium acetate, zirconium isopropoxide, titanium tetrachloride, titanium oxysulfate, ammonium fluotitanate, titanium sulfate, tetrabutyl titanate, titanium trichloride and titanous sulfate. The type of the first solvent is not specifically limited, as long as the compound containing an IVB group metal can be dissolved and the β zeolite can be dispersed, for example, it can be selected from one or more of deionized water, ethanol, acetone and n-hexane.

According to the present invention, the β zeolite is well-known to persons skilled in the art, for example, it can be selected from one or more of hydrogen type β zeolite, sodium type β zeolite, β zeolite containing phosphorous, β zeolite containing a rare earth metal and β zeolite containing phosphorus and a rare earth metal, preferably hydrogen type β zeolite and β zeolite containing phosphorous.

According to the present invention, in step (1), the pH value of the first slurry can be adjusted to 5-8. Preferably, the pH value of the first slurry is adjusted to 6-8. The way to adjust the pH value is not specifically defined. For example, the pH value of the first slurry can be adjusted by adding an alkaline solution, which can be one or more of ammonia water, an aqueous solution of water glass, an aqueous solution of sodium metaaluminate and an aqueous solution of sodium hydroxide, preferably ammonia water. The concentration of alkaline solution can vary in a large range. In a specific embodiment, the concentration of the alkaline solution based on $OH^-$ can be 2-20 wt %, preferably 3-15 wt %. In another specific embodiment, the alkaline solution is dilute ammonia water with a concentration of 2-20 wt %, preferably 3-15 wt % based on $NH_3$. By adjusting the pH value of the mixture, the IVB group metal ions can form a hydroxide precipitate, which is conducive to the uniform dispersion of the precipitate containing an IVB group metal in the surface of the β zeolite.

The present invention provides, in the third aspect, a method for preparing the catalytic cracking catalyst provided in the second aspect of the present invention. The method comprises: mixing the Y-type zeolite, the modified β zeolite provided in the first aspect of the present invention, the clay, the heat-resistant inorganic oxide and a second solvent to give a second slurry, granulating the second slurry obtained, and carrying out drying and/or a second calcination.

According to the present invention, the heat-resistant inorganic oxide comprises the heat-resistant inorganic oxide itself and/or the precursors of the heat-resistant inorganic oxide. The heat-resistant inorganic oxide itself can be selected from one or more of a heat-resistant inorganic oxide used as the matrix and/or binder components of the catalytic cracking catalyst, such as one or more of aluminum oxide, silicon oxide and amorphous silicon aluminum. The precursors of the heat-resistant inorganic oxide refer to substances capable of forming the heat-resistant inorganic oxide in the process of preparing the catalyst of the present invention, for example, the precursor of aluminum oxide can be selected from one or more of aluminum sol, pseudo boehmite, boehmite, alumina trihydrate and amorphous aluminum hydroxide; For example, the precursor of silicon oxide can be selected from one or more of silica sol, silica gel and water glass. These heat-resistant inorganic oxides themselves or/and the precursors of the heat-resistant inorganic oxides and their preparation methods are well-known to persons in the art.

In a preferred specific embodiment, clay, the heat-resistant inorganic oxide and the first solvent are subjected to beating. The slurry obtained, the modified β zeolite and the Y-type zeolite are mixed and stirred. Through spray granulation, calcination, optionally washing and drying, the catalytic cracking catalyst of the present invention is obtained. Preferably, acid is added during or after beating. The pH value of the slurry is adjusted to 1-5, preferably 2-4, and the slurry is aged at 30-90° C. for 0.5-5 hr. The acid can be a water-soluble inorganic acid or organic acid, preferably one or more of hydrochloric acid, nitric acid and phosphoric acid. Therein the method and conditions of spray drying are well-known to persons in the art and will not be described here.

According to the present invention, the solid content of the second slurry can vary in a large range, for example, the solid content of the second slurry is 15-50 wt %, preferably 20-45 wt %.

According to the present invention, the drying temperature can be 80-200° C. and the drying time can be 0.5-24 hr. Preferably, the temperature is 80-120° C. and the time is 0.5-12 hr. The temperature of the second calcination can be 350-700° C., and the time can be 0.5-5 hr. Preferably, the temperature is 400-650° C., and the time is 1-4 hr. The calcination can be conducted in any atmosphere, such as an air atmosphere.

The present invention provides, in the fourth aspect, an application of the modified β zeolite provided in the first aspect of the present invention or the catalytic cracking catalyst provided in the second aspect of the present invention in the catalytic cracking of heavy oils.

The present invention will be further described in the following examples, but the present invention is not limited thereby.

The kaolin is produced by Suzhou kaolin company, with a solid content of 76 wt %;

The content of aluminum oxide in the aluminum sol is 21.5 wt %;

The pseudo boehmite is produced by an aluminum plant from Shandong, with a solid content of 62.0 wt %;

The acidified pseudo boehmite has a solid content of 12.0 wt %, acidified with hydrochloric acid.

When being acidified, the molar ratio of the acid (HCl) to aluminum oxide is 0.15;

The ultrastable Y zeolite, USY, employed has a solid content of 94.7%, a unit cell constant of 24.48 Å, and a $Na_2O$ content of 1.3% and a $RE_2O_3$ content of 2.5% by weight percentage; The rare earth ultrastable Y zeolite, REUSY, has a solid content of 84.8%, a unit cell constant of 24.51 Å, and a $Na_2O$ content of 1.6% and a $RE_2O_3$ content of 12.0% by weight percentage;

The Y zeolite containing phosphorus, PREHY, has a solid content of 92.4%, a unit cell constant of 24.59 Å, and a $Na_2O$ content of 1.5%, a $P_2O_5$ content of 7.5% and a $RE_2O_3$ content of 8.5% by weight percentage;

The hydrogen type β zeolite has a solid content of 75%, $SiO_2/Al_2O_3$ (molar ratio)=25, and a $Na_2O$ content of 0.15%;

The phosphorus modified β zeolite has a solid content of 82.5%, $SiO_2/Al_2O_3$ (molar ratio)=25, a $Na_2O$ content of 0.15% and a $P_2O_5$ content of 7.0%.

All of the above Y-type zeolites and β zeolites are produced by Sinopec Catalyst Co., Ltd., and the rest reagents are produced by Sinopharm Chemical Reagent Co., Ltd. All specifications are analytically pure. Among the contents, those not specifically indicated are by weight percentage.

The concentration of the dilute ammonia water based on $NH_3$ is 12 wt %.

Methods for testing the properties of the modified β zeolites (1) Determination of acid content and acid strength: the thermogravimetric programmed temperature risedesorption (TG-TPD) technology is employed to saturate the zeolite sample at room temperature with $NH_3$ as the alkaline adsorption gas. Then the weight loss of $NH_3$ during the programmed temperature rise and desorption is measured by a thermogravimetric differential thermogravimetry (PCT-2). With the desorption amount of $NH_3$ as the acid amount of the sample, the temperature zones of the weak acid center, medium strong acid center and strong acid center of the zeolite are 120-270° C., 270-390° C. and 390-560° C., respectively. The molar amounts of the $NH_3$ desorbed in the corresponding temperature ranges correspond to the acid amounts of the zeolite.

(2) B acid and L acid: The surface acidity of the catalyst is characterized by Nicolet 560 infrared spectrometer manufactured by US Nicolet Corporation, with a wave number of 1400-1700 $cm^{-1}$. The B acid in the catalyst is characterized by a characteristic peak at 1540 $cm^{-1}$, and the L acid in the catalyst is characterized by a characteristic peak at 1450 $cm^{-1}$. Based on the integral calculation of the corresponding peak area, the ratio of B acid to L acid refers to the ratio of the peak area of the characteristic peak of B acid to the peak area of the characteristic peak of L acid.

(3) The weight content of the IVB group metal element on the surface of the modified β zeolite and the weight content of the IVB group metal element in body phase: the weight content of the IVB group metal element on the zeolite surface refers to the weight content of the IVB group metal element analyzed using X-ray photoelectron spectroscopy (XPS) within the range of 2-5 nm of the zeolite surface.

The weight content of the IVB group metal element in the modified β zeolite body phase is the weight content of the IVB group metal element in the zeolite as analyzed by a chemical method (ICP (Jarrell-Ash, ICAP 9000) element analysis method for determination).

In the present application, the IVB group metal element contained in the modified β zeolite refers to the IVB group metal element contained in the body phase of the modified β zeolite. The weight content of the IVB group metal element based on oxide contained in the modified β zeolite can be obtained by converting the measured weight content of the IVB group metal element in the modified β zeolite body phase. The conversion method is well-known to persons skilled in the art, and will not be described here. The properties of the modified β zeolites prepared in the examples and the comparative examples are shown in Table 1.

Analysis of the composition of the catalyst: X-ray fluorescence spectrometry (XRF) is employed.

Analysis results of the composition of the catalyst are shown in Tables 2 to 4.

Examples 1-8 are examples of the preparation of the modified β zeolites. Comparative Examples 1~4 are comparative examples of the preparation of the modified β zeolites.

Example 1

(1) 2250 g of deionized water, 39.23 g of zirconium oxychloride ($ZrOCl_2 \cdot 8H_2O$) and 7.5 g of hydroxypropyl methyl cellulose were mixed. The pH of the mixture was adjusted to 7.0 with dilute ammonia water. The mixture was stirred for 40 minutes to give a first slurry;

(2) The first slurry and 150 g of hydrogen type β zeolite were mixed, and stirred at 40° C. for 90 minutes. The mixture was filtered. The filter cake obtained was calcined in air atmosphere at 550° C. for 2 hr to give the modified β zeolite of the present invention, recorded as B1.

Therein, the weight ratio of the amount of zirconium oxychloride, the amount of β zeolite and the amount of hydroxypropyl methyl cellulose is 0.1:1:0.05. Zirconium oxychloride is based on zirconia, and β zeolite is based on the dry basis weight.

Example 2

(1) 1500 g of deionized water, 28.34 g of zirconium isopropoxide and 3 g of methyl cellulose were mixed. The pH of the mixture was adjusted to 5.0 with dilute ammonia water. The mixture was stirred for 60 minutes to give a first slurry;

(2) The first slurry and 150 g of hydrogen type β zeolite were mixed, and stirred at 60° C. for 120 minutes. The mixture was filtered. The filter cake obtained was calcined in air atmosphere at 500° C. for 3 hr to give the modified β zeolite of the present invention, recorded as B2.

Therein, the weight ratio of the amount of zirconium isopropoxide, the amount of β zeolite and the amount of methyl cellulose is 0.06:1:0.02. Zirconium isopropoxide is based on zirconia, and β zeolite is based on the dry basis weight.

Example 3

(1) 750 g of deionized water, 10.45 g of zirconium nitrate ($Zr(NO_3)_4 \cdot 5H_2O$) and 0.8 g of lignin were mixed. The pH of the mixture was adjusted to 5 with dilute ammonia water. The mixture was stirred for 30 minutes to give a first slurry;

(2) The first slurry and 150 g of hydrogen type β zeolite were mixed, and stirred at 80° C. for 180 minutes. The mixture was filtered. The filter cake obtained was calcined in air atmosphere at 550° C. for 1 hr to give the modified β zeolite of the present invention, recorded as B3.

Therein, the weight ratio of the amount of zirconium nitrate, the amount of β zeolite and the amount of lignin is 0.02:1:0.005. Zirconium nitrate is based on zirconia, and β zeolite is based on the dry basis weight.

Example 4

(1) 3000 g of deionized water, 47.08 g of zirconium oxychloride ($ZrOCl_2 \cdot 8H_2O$) and 15 g of viscose fiber were mixed. The pH of the mixture was adjusted to 7.5 with dilute ammonia water. The mixture was stirred for 60 minutes to give a first slurry;

(2) The first slurry and 150 g of hydrogen type β zeolite were mixed, and stirred at 45° C. for 85 minutes. The mixture was filtered. The filter cake obtained was calcined in air atmosphere at 450° C. for 3 hr to give the modified β zeolite of the present invention, recorded as B4.

Therein, the weight ratio of the amount of zirconium oxychloride, the amount of β zeolite and the amount of viscose fiber is 0.12:1:0.1. Zirconium oxychloride is based on zirconia, and β zeolite is based on the dry basis weight.

Example 5

(1) 1500 g of deionized water, 18.9 g of zirconium isopropoxide and 6 g of hydroxyethyl cellulose were mixed. The pH of the mixture was adjusted to 5.5 with dilute ammonia water. The mixture was stirred for 30 minutes to give a first slurry;

(2) The first slurry and 150 g of phosphorous modified β zeolite were mixed, and stirred at 80° C. for 60 minutes. The mixture was filtered. The filter cake obtained was calcined in air atmosphere at 550° C. for 2 hr to give the modified β zeolite of the present invention, recorded as B5.

Therein, the weight ratio of the amount of zirconium isopropoxide, the amount of β zeolite and the amount of hydroxyethyl cellulose is 0.04:1:0.04. Zirconium isopropoxide is based on zirconia, and β zeolite is based on the dry basis weight.

Example 6

A modified β zeolite B6 was prepared using the same method as in Example 1, except that in step (1), 2250 g of deionized water, 39.23 zirconium oxychloride ($ZrOCl_2 \cdot 8H_2O$) and 0.12 g of hydroxypropyl methyl cellulose were mixed, the pH of the mixture was adjusted to 7.0 with dilute ammonia water, and the mixture was stirred for 40 minutes to give the first slurry.

Therein, the weight ratio of the amount of zirconium oxychloride, the amount of β zeolite and the amount of hydroxypropyl methyl cellulose is 0.10:1:0.0008. Zirconium oxychloride is based on zirconia, and β zeolite is based on the dry basis weight.

Example 7

A modified β zeolite B7 was prepared using the same method as in Example 1, except that in step (1), 2250 g of deionized water, 62.78 g of zirconium oxychloride ($ZrOCl_2 \cdot 8H_2O$) and 7.5 g of hydroxypropyl methyl cellulose were mixed, the pH of the mixture was adjusted to 7.0 with dilute ammonia water, and the mixture was stirred for 40 minutes to give the first slurry.

Therein, the weight ratio of the amount of zirconium oxychloride, the amount of β zeolite and the amount of hydroxypropyl methyl cellulose is 0.16:1:0.05. Zirconium oxychloride is based on zirconia.

Example 8

A modified β zeolite B8 was prepared using the same method as in Example 1, except that in step (1), 2250 g of deionized water, 35.61 g of titanium tetrachloride and 7.5 g of hydroxypropyl methyl cellulose were mixed, the pH of the mixture was adjusted to 7.0 with dilute ammonia water, and the mixture was stirred for 40 minutes to give the first slurry.

Therein, the weight ratio of the amount of titanium tetrachloride, the amount of β zeolite and the amount of hydroxypropyl methyl cellulose is 0.1:1:0.05. Titanium tetrachloride is based on titanium oxide, and β zeolite is based on the dry basis weight.

Comparative Example 1

A modified β zeolite was prepared using the same method as in Example 1, except that the pH of the first slurry was not adjusted.

(1) 2250 g of deionized water, 39.2 g of zirconium oxychloride $ZrOCl_2.8H_2O$ and 7.5 g of hydroxypropyl methyl cellulose were mixed. The mixture was stirred for 40 minutes to give a first slurry. The slurry obtained had a pH of 1.4.

(2) The first slurry and 200 g of hydrogen type β zeolite were mixed, and stirred at 40° C. for 90 minutes. The mixture was filtered. The filter cake obtained was calcined in air atmosphere at 550° C. for 2 hr to give a comparative β zeolite, recorded as DB1.

Comparative Example 1'

A modified β zeolite was prepared using the same method as in Example 1, except that the pH of the first slurry was not adjusted.

(1) 2250 g of deionized water, 39.23 g of zirconium oxychloride $ZrOCl_2.8H_2O$ and 7.5 g of hydroxypropyl methyl cellulose were mixed. The mixture was stirred for 40 minutes to give a first slurry. The slurry obtained had a pH of 1.4.

(2) The first slurry and 150 g of hydrogen type β zeolite were mixed, and stirred at 40° C. for 90 minutes. The mixture was filtered. The filter cake obtained was calcined in air atmosphere at 550° C. for 2 hr to give a comparative β zeolite, recorded as DB1-1.

Comparative Example 2

A modified β zeolite was prepared using the same method as in Example 2, except that no carbon source was added.

(1) 1500 g of deionized water and 28.3 g of zirconium isopropoxide were mixed uniformly. The pH of the mixture was adjusted to 5.0 with dilute ammonia water. The mixture was stirred for 60 minutes to give a first slurry;

(2) The first slurry and 200 g of hydrogen type β zeolite were mixed, and heated to 60° C. for stirring for 120 minutes. The mixture was filtered. The filter cake obtained was calcined in air atmosphere at 500° C. for 3 hr to give a comparative β zeolite, recorded as DB2.

Comparative Example 2'

A modified β zeolite was prepared using the same method as in Example 2, except that no carbon source was added.

(1) 1500 g of deionized water and 28.34 g of zirconium isopropoxide were mixed uniformly. The pH of the mixture was adjusted to 5.0 with dilute ammonia water. The mixture was stirred for 60 minutes to give a first slurry;

(2) The first slurry and 150 g of hydrogen type β zeolite were mixed, and heated to 60° C. for stirring for 120 minutes. The mixture was filtered. The filter cake obtained was calcined in air atmosphere at 500° C. for 3 hr to give a comparative β zeolite, recorded as DB2-1.

Comparative Example 3

A modified β zeolite was prepared by a conventional aqueous solution impregnation method.

At room temperature, 200 g of Hβ zeolite was subjected to beating with 1500 g of deionized water. 45 g of $(NH_4)_2SO_4$ was then added and mixed uniformly. Then the mixture was heated to 90° C. for exchange for 1 hr, and filtered and washed with the deionized water. The filter cake was calcined at 600° C. for 2 hr to give a hydrogen type β zeolite.

47.1 g zirconium oxychloride ($ZrOCl_2.8H_2O$) was dissolved in 200 g of deionized water to form an impregnating solution, and the impregnating solution obtained was mixed with the treated Hβ zeolite uniformly. The mixture was left standing at room temperature for 1 hr, and then calcined at 500° C. for 4h to give a modified β zeolite, recorded as DB3.

Comparative Example 4

A modified β zeolite was prepared by an organic solvent solution impregnation method, recorded as DB4.

At room temperature, 200 g of Hβ zeolite was subjected to beating with 1500 g of deionized water. 45 g of $(NH_4)_2SO_4$ was then added and mixed uniformly. Then the mixture was heated to 90° C. for exchange for 1 hr, and filtered and washed with the deionized water. The filter cake was calcined at 600° C. for 2 hr to give a hydrogen type β zeolite.

47.1 g zirconium oxychloride ($ZrOCl_2.8H_2O$) was dissolved in 200 g of ethanol to form an impregnating solution, and the impregnating solution obtained was mixed with the treated β zeolite uniformly. The mixture was left standing at room temperature for 1 hr, and then calcined at 500° C. for 4h to give a modified β zeolite, recorded as DB4.

Examples 9-22 are the examples of the catalytic cracking catalysts containing the modified β zeolites of the present invention. Comparative Examples 5-8 and Comparative Examples 9-10 are the comparative examples of the catalytic cracking catalysts containing the comparative modified β zeolites.

Example 9

447 g of kaolin, 372 g of aluminum sol and 513 g of decationized water were put in a beating tank for beating. Then 1666 g of acidified pseudo boehmite was added. After stirring for 60 minutes, 271 g of REUSY zeolite and 150 g of modified β zeolite B1 (dry basis) were further added for beating with 578 g of deionized water to form a slurry which was homogeneously dispersed (stirring) for 30 minutes. Then the slurry obtained was spray dried for shaping. It was calcined at 500° C. for 2 hr to give the catalytic cracking catalyst C1 provided by the present invention.

Examples 10-16

Catalytic cracking catalysts C2-C8 were prepared using the same method as in Example 9, except that the modified β zeolites for preparing the catalytic cracking catalysts were respectively the modified β zeolites B2-B8 prepared in Examples 2-8.

Comparative Examples 5, 5', 6, 6', 7 and 8

Catalytic cracking catalysts DC1, DC1-1, DC2, DC2-1, DC3 and DC4 were prepared using the same method as in Example 9, except that the modified β zeolites for preparing the catalytic cracking catalysts were respectively the modified β zeolites DB1, DB1-1, DB2, DB2-1, DB3 and DB4 prepared in Comparative Examples 1, 1', 2, 2', 3 and 4.

Example 17

421 g of kaolin, 372 g of aluminum sol and 487 g of decationized water were put in a beating tank for beating. Then 1666 g of acidified pseudo boehmite was added. After stirring for 60 minutes, 105 g of USY zeolite, 236 g of REUSY and 100 g of the above modified β zeolite B1 (dry basis) were further added for beating with 847 g of deionized water to form a slurry which was homogeneously dispersed (stirring) for 30 minutes. Then the slurry obtained was spray dried for shaping. It was calcined at 500° C. for 2 hr to give the catalytic cracking catalyst C9 provided by the present invention.

Example 18

421 g of kaolin, 372 g of aluminum sol and 537 g of decationized water were put in a beating tank for beating. Then 1666 g of acidified pseudo boehmite was added. After stirring for 60 minutes, 294 g of REUSY zeolite and 150 g of the above modified β zeolite B2 (dry basis) were further added for beating with 560 g of deionized water to form a slurry which was homogeneously dispersed (stirring) for 30 minutes. Then the slurry obtained was spray dried for shaping. It was calcined at 500° C. for 2 hr to give the catalytic cracking catalyst C10 provided by the present invention.

Example 19

421 g of kaolin, 372 g of aluminum sol and 540 g of decationized water were put in a beating tank for beating. Then 1666 g of acidified pseudo boehmite was added. After stirring for 60 minutes, 105 g of USY zeolite, 294 g of REUSY zeolite and 50 g of the above modified β zeolite B3 (dry basis) were further added for beating with 844 g of deionized water to form a slurry which was homogeneously dispersed (stirring) for 30 minutes. Then the slurry obtained was spray dried for shaping. It was calcined at 500° C. for 2 hr to give the catalytic cracking catalyst C11 provided by the present invention.

Example 20

421 g of kaolin, 372 g of aluminum sol and 487 g of decationized water were put in a beating tank for beating. Then 1666 g of acidified pseudo boehmite was added. After stirring for 60 minutes, 162 g of PREUSY zeolite and 250 g of the above modified β zeolite B4 (dry basis) were further added for beating with 640 g of deionized water to form a slurry which was homogeneously dispersed (stirring) for 30 minutes. Then the slurry obtained was spray dried for shaping. It was calcined at 500° C. for 2 hr to give the catalytic cracking catalyst C12 provided by the present invention.

Example 21

421 g of kaolin, 372 g of aluminum sol and 487 g of decationized water were put in a beating tank for beating. Then 1666 g of acidified pseudo boehmite was added. After stirring for 60 minutes, 105 g of USY zeolite, 259 g of REUSY zeolite and 80 g of the above modified β zeolite B5 (dry basis) were further added for beating with 867 g of deionized water to form a slurry which was homogeneously dispersed (stirring) for 30 minutes. Then the slurry obtained was spray dried for shaping. It was calcined at 500° C. for 2 hr to give the catalytic cracking catalyst C13 provided by the present invention.

Example 22

421 g of kaolin, 372 g of aluminum sol and 487 g of decationized water were put in a beating tank for beating. Then 1666 g of acidified pseudo boehmite was added. After stirring for 60 minutes, 190 g of USY zeolite, 235 g of REUSY and 20 g of the above modified β zeolite B1 (dry basis) were further added for beating with 847 g of deionized water to form a slurry which was homogeneously dispersed (stirring) for 30 minutes. Then the slurry obtained was spray dried for shaping. It was calcined at 500° C. for 2 hr to give the catalytic cracking catalyst C14 provided by the present invention.

Comparative Example 9

The present comparative example is the preparation of a catalytic cracking catalyst free of β zeolite.

A catalyst was prepared according to the method of Example 17. 421 g of kaolin, 372 g of aluminum sol and 487 g of decationized water were put in a beating tank for beating. Then 1666 g of acidified pseudo boehmite was added. After stirring for 60 minutes, 211 g of USY zeolite and 236 g of REUSY (dry basis) were further added for beating with 841 g of deionized water to form a slurry which was homogeneously dispersed (stirring) for 30 minutes. Then the slurry obtained was spray dried for shaping. It was calcined at 500° C. for 2 hr to give a comparative catalytic cracking catalyst DC5.

Comparative Example 10

A phosphorus and iron modified β zeolite DB5 were prepared according to the method in Example 4 of CN104998681A.

A catalyst was prepared according to the method of Example 21. 421 g of kaolin, 372 g of aluminum sol and 487 g of decationized water were put in a beating tank for beating. Then 1666 g of acidified pseudo boehmite was added. After stirring for 60 minutes, 105 g of USY zeolite, 259 g of REUSY zeolite and 80 g of the above phosphorus and iron modified β zeolite (dry basis) were further added for beating with 867 g of deionized water to form a slurry which was homogeneously dispersed (stirring) for 30 minutes. Then the slurry obtained was spray dried for shaping. It was calcined at 500° C. for 2 hr to give a comparative catalytic cracking catalyst DC6.

Evaluation of Catalytic Cracking Catalysts

The catalytic cracking catalysts C1-C8 and DC1-DC4 were aged at 800° C. with 100% steam for 12 hr in a fixed bed aging unit in advance, and then evaluated in a small fixed fluidized bed unit. The properties of the reaction feed oil are shown in Table 8. The reaction temperature is 500° C., and the weight ratio of catalyst to oil is 5.92.

The catalytic cracking catalysts C9-C14 and DC5-DC6 were aged at 800° C. with 100% steam for 8 hr in a fixed bed aging unit in advance, and then evaluated in a small fixed fluidized bed unit. The properties of the reaction feed oil are shown in Table 8. The reaction temperature is 500° C., and the weight ratio of catalyst to oil is 4.0.

Therein, conversion rate=gasoline yield+liquefied gas yield+dry gas yield+coke yield;

C4 olefin yield=1-butene yield+2-butene yield+isobutylene yield;

C4 olefin concentration=C4 olefin yield/liquefied gas yield;

C4 olefin selectivity=C4 olefin yield/C4 fraction yield.

The evaluation results are shown in Table 5-Table 7. In the tables, the strong acid amount/total acid amount refers to the number of the amount of strong acid centers in the total acid amount, and the medium strong acid amount/total acid amount refers to the number of the amount of medium strong acid centers in the total acid amount.

TABLE 1

Properties of Modified β Zeolites

|  | Zeolite No. | Content of IVB group metal element, wt % | Weight content of IVB group metal element in zeolite body phase/Weight content of IVB group metal element on zeolite surface | B acid/L acid | strong acid amount/total acid amount, % | medium strong acid amount/total acid amount, % |
|---|---|---|---|---|---|---|
| Ex. 1 | B1 | 9.9 | 0.32 | 1.11 | 15.0 | 40.0 |
| Ex. 2 | B2 | 6.0 | 0.23 | 1.20 | 20.0 | 36.0 |
| Ex. 3 | B3 | 2.0 | 0.16 | 1.22 | 16.0 | 42.0 |
| Ex. 4 | B4 | 11.8 | 0.41 | 1.35 | 12.0 | 45.0 |
| Ex. 5 | B5 | 4.0 | 0.25 | 1.46 | 13.0 | 48.0 |
| Ex. 6 | B6 | 9.8 | 0.32 | 1.00 | 25.0 | 31.0 |
| Ex. 7 | B7 | 13.5 | 0.32 | 0.90 | 22.0 | 32.0 |
| Ex. 8 | B8 | 8.2 | 0.45 | 1.18 | 14.5 | 36.8 |
| Comp. Ex. 1 | DB1 | 7.6 | 0.05 | 0.61 | 35.0 | 22.0 |
| Comp. Ex. 1' | DB1-1 | 7.2 | 0.08 | 0.66 | 32.0 | 24.0 |
| Comp. Ex. 2 | DB2 | 5.4 | 0.08 | 0.65 | 31.0 | 24.0 |
| Comp. Ex. 2' | DB2-1 | 5.6 | 0.05 | 0.66 | 34.0 | 26.0 |
| Comp. Ex. 3 | DB3 | / | / | 0.74 | 30.0 | 20.0 |
| Comp. Ex. 4 | DB4 | 7.8 | 1.3 | 0.68 | 28.4 | 24.8 |
| Comp. Ex. 10 | DB5 | / | / | 0.55 | 35.0 | 13.0 |

It can be seen from the results in Table 1 that compared with Comp. Ex. 1, when the amount of the zirconium-containing compound added is kept the same, the modified β zeolite prepared according to Ex. 1 has a high zirconia content, indicating that adjusting the pH of the slurry with dilute ammonia water is better to the full utilization of the zirconium-containing compound and conducive to the precipitation of the zirconium-containing compound on the surface of the β zeolite, whereas the zirconium-containing compound in Comp. Ex. 1 is lost in filtration. Thus, in Example 1, the ratio of the weight content of the IVB group metal element in zeolite body phase/the weight content of the IVB group metal element on zeolite surface is relatively low, the ratio of B acid/L acid is relatively high, and the number of medium strong acid centers is large. Compared with Comp. Ex. 3, the modified β zeolite prepared according to the present invention has a higher B acid/L acid and a higher number of medium strong acid centers.

TABLE 2

Composition of Catalytic Cracking Catalysts

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Catalyst No. | C1 | C2 | C3 | C4 | C5 | C6 | C7 | C8 |
| Y zeolite type | REUSY | REUSY | REUSY | REUSY | REUSY | REUSY | REUSY | REUSY |
| β zeolite type | B1 | B2 | B3 | B4 | B5 | B6 | B7 | B8 |
| Composition, wt % |  |  |  |  |  |  |  |  |
| Y zeolite | 23 | 23 | 23 | 23 | 23 | 23 | 23 | 23 |
| β zeolite | 15 | 15 | 15 | 15 | 15 | 15 | 15 | 15 |
| Kaolin | 34 | 34 | 34 | 34 | 34 | 34 | 34 | 34 |
| $Al_2O_3$ | 28 | 28 | 28 | 28 | 28 | 28 | 28 | 28 |

TABLE 3

Composition of Catalytic Cracking Catalysts

| | Ex. 17 | Ex. 18 | Ex. 19 | Ex. 20 | Ex. 21 | Ex. 22 |
|---|---|---|---|---|---|---|
| Catalyst No. | C9 | C10 | C11 | C12 | C13 | C14 |
| Y zeolite type | USY | REUSY | USY | REUSY | USY | USY |
|  | REUSY | | REUSY | | REUSY | REUSY |
| β zeolite type | B1 | B2 | B3 | B4 | B5 | B1 |
| Composition, wt % | | | | | | |
| Y zeolite | 30 | 25 | 35 | 15 | 32 | 38 |
| β zeolite | 10 | 15 | 5 | 25 | 8 | 2 |
| Kaolin | 32 | 32 | 32 | 32 | 32 | 32 |
| $Al_2O_3$ | 28 | 28 | 28 | 28 | 28 | 28 |

TABLE 4

Composition of Catalytic Cracking Catalysts

| | Comp. Ex. 5 | Comp. Ex. 5' | Comp. Ex. 6 | Comp. Ex. 6' | Comp. Ex. 7 | Comp. Ex. 8 | Comp. Ex. 9 | Comp. Ex. 10 |
|---|---|---|---|---|---|---|---|---|
| Catalyst No. | DC1 | DC1-1 | DC2 | DC2-1 | DC3 | DC4 | DC5 | DC6 |
| Y zeolite type | REUSY | REUSY | REUSY | REUSY | REUSY | REUSY | USY REUSY | USY REUSY |
| β zeolite type | DB1 | DB1-1 | DB2 | DB2-1 | DB3 | DB4 | / | DB5 |
| Composition, wt % | | | | | | | | |
| Y zeolite | 23 | 23 | 23 | 23 | 23 | 23 | 40 | 32 |
| β zeolite | 15 | 15 | 15 | 15 | 15 | 15 | / | 8 |
| Kaolin | 34 | 34 | 34 | 34 | 34 | 34 | 32 | 32 |
| $Al_2O_3$ | 28 | 28 | 28 | 28 | 28 | 28 | 28 | 28 |

TABLE 5

Evaluation Results

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Catalyst | C1 | C2 | C3 | C4 | C5 | C6 | C7 | C8 |
| Product distribution, wt % | | | | | | | | |
| Dry gas | 1.82 | 1.99 | 1.80 | 1.78 | 1.85 | 1.83 | 1.72 | 1.81 |
| Liquefied gas | 18.46 | 18.25 | 18.19 | 18.26 | 18.24 | 18.33 | 18.16 | 18.35 |
| Gasoline | 51.32 | 51.65 | 51.41 | 51.50 | 51.62 | 51.36 | 51.32 | 51.24 |
| Diesel oil | 14.19 | 13.56 | 14.04 | 14.15 | 13.89 | 14.22 | 14.35 | 14.23 |
| Heavy oil | 7.08 | 7.07 | 7.12 | 6.98 | 7.11 | 7.15 | 6.98 | 7.23 |
| Coke | 7.13 | 7.48 | 7.44 | 7.33 | 7.29 | 7.11 | 7.47 | 7.14 |
| Conversion rate, % | 78.73 | 79.37 | 78.84 | 78.87 | 79.00 | 78.63 | 78.67 | 78.54 |
| Gasoline + liquefied gas, % | 69.78 | 69.90 | 69.60 | 69.76 | 69.86 | 69.69 | 69.48 | 69.59 |
| Propylene yield, % | 4.79 | 4.72 | 4.72 | 4.75 | 4.73 | 4.68 | 4.69 | 4.68 |
| Propylene concentration of liquefied gas, % | 25.95 | 25.86 | 25.95 | 26.01 | 25.93 | 25.53 | 25.83 | 25.50 |
| C4 olefin yield, % | 5.57 | 5.60 | 5.48 | 5.64 | 5.57 | 5.42 | 5.39 | 5.41 |
| C4 olefin concentration of liquefied gas/% | 30.17 | 30.68 | 30.13 | 30.89 | 30.54 | 29.57 | 29.68 | 29.48 |
| C4 olefin selectivity, % | 45.47 | 45.86 | 45.25 | 45.85 | 45.40 | 44.98 | 44.55 | 44.34 |

TABLE 6

Evaluation Results

| No. | Ex. 17 | Ex. 18 | Ex. 19 | Ex. 20 | Ex. 21 | Ex. 22 |
|---|---|---|---|---|---|---|
| Catalyst No. | C9 | C10 | C11 | C12 | C13 | C14 |
| product distribution, wt % | | | | | | |
| dry gas | 1.91 | 1.98 | 1.88 | 2.04 | 1.97 | 1.89 |
| liquefied gas | 16.80 | 17.16 | 16.70 | 17.75 | 16.94 | 16.78 |

TABLE 6-continued

Evaluation Results

| No. | Ex. 17 | Ex. 18 | Ex. 19 | Ex. 20 | Ex. 21 | Ex. 22 |
|---|---|---|---|---|---|---|
| gasoline | 48.85 | 49.28 | 48.37 | 48.50 | 48.67 | 48.67 |
| diesel oil | 17.44 | 16.84 | 17.92 | 16.63 | 17.37 | 17.50 |
| heavy oil | 8.16 | 8.28 | 8.48 | 8.92 | 8.72 | 8.22 |
| coke | 6.84 | 6.46 | 6.65 | 6.15 | 6.33 | 6.94 |
| gasoline + liquefied gas | 65.64 | 66.44 | 65.07 | 66.25 | 65.61 | 65.45 |
| conversion rate, % | 74.40 | 74.88 | 73.60 | 74.45 | 73.91 | 74.28 |
| Propylene yield, % | 4.43 | 4.54 | 4.38 | 4.67 | 4.45 | 4.40 |
| Propylene concentration of liquefied gas, % | 26.37 | 26.49 | 26.23 | 26.31 | 26.26 | 26.22 |
| C4 olefin yield, % | 4.10 | 4.21 | 4.05 | 4.69 | 4.38 | 4.04 |
| C4 olefin concentration of liquefied gas/% | 24.40 | 24.54 | 24.26 | 26.42 | 25.85 | 24.08 |
| C4 olefin selectivity, % | 36.44 | 37.63 | 36.12 | 38.02 | 37.15 | 36.08 |

TABLE 7

Evaluation Results

| | Comp. Ex. 5 | Comp. Ex. 5' | Comp. Ex. 6 | Comp. Ex. 6' | Comp. Ex. 7 | Comp. Ex. 8 | Comp. Ex. 9 | Comp. Ex. 10 |
|---|---|---|---|---|---|---|---|---|
| Catalyst | DC1 | DC1-1 | DC2 | DC2-1 | DC3 | DC4 | DC5 | DC6 |
| Product distribution, wt % | | | | | | | | |
| Dry gas | 1.83 | 1.82 | 1.79 | 1.80 | 1.76 | 1.80 | 1.88 | 2.11 |
| Liquefied gas | 18.05 | 18.00 | 18.14 | 18.16 | 18.69 | 18.23 | 16.40 | 16.30 |
| Gasoline | 50.62 | 50.51 | 50.35 | 50.30 | 49.04 | 49.21 | 47.17 | 47.85 |
| Diesel oil | 15.16 | 15.33 | 14.87 | 14.90 | 16.47 | 16.54 | 18.83 | 18.44 |
| Heavy oil | 7.24 | 7.22 | 7.66 | 7.71 | 7.01 | 6.98 | 9.47 | 8.96 |
| Coke | 7.10 | 7.12 | 7.19 | 7.13 | 7.03 | 7.24 | 6.25 | 6.34 |
| Conversion rate, % | 77.6 | 77.45 | 77.47 | 77.39 | 76.52 | 76.48 | 71.70 | 72.60 |
| Gasoline + liquefied gas, % | 68.67 | 68.51 | 68.49 | 68.46 | 67.73 | 67.44 | 63.57 | 64.14 |
| Propylene yield, % | 4.68 | 4.62 | 4.64 | 4.66 | 4.79 | 4.75 | 4.04 | 4.52 |
| Propylene concentration of liquefied gas, % | 25.93 | 25.67 | 25.58 | 25.66 | 25.63 | 26.06 | 24.64 | 27.73 |
| C4 olefin yield, % | 4.92 | 4.90 | 4.73 | 4.74 | 4.81 | 4.67 | 3.26 | 3.83 |
| C4 olefin concentration of liquefied gas/% | 27.26 | 27.22 | 26.07 | 26.10 | 25.74 | 25.62 | 19.88 | 23.50 |
| C4 olefin selectivity, % | 40.46 | 40.30 | 38.71 | 38.76 | 39.59 | 36.83 | 32.58 | 32.21 |

TABLE 8

Properties of Feed Oil

| | Properties of feed oil |
|---|---|
| density(20° C.)/(kg · cm$^{-3}$) | 919.3 |
| w(carbon residue)/% | 2.62 |
| w(C)/% | 87.42 |
| w(H)/% | 11.5 |
| w(S)/% | 0.26 |
| w(N)/% | 0.0616 |
| metal mass fraction/(μg · g$^{-1}$) | |
| Fe | 3.2 |
| Ni | 3.8 |
| V | 3.8 |
| four components mass fraction/% | |
| Saturated hydrocarbon | 62.1 |
| Aromatic hydrocarbon | 26.6 |
| Colloid | 10.7 |
| Asphaltene | 0.6 |
| Vacuum distillation range/° C. | |
| Initial boiling point | 226.7 |
| 5% | 280.9 |
| 10% | 317 |
| 30% | 400.7 |
| 50% | 454.4 |
| 70% | 527 |
| Final boiling point | 540 |
| Distillation end volume yield/% | 72.6 |

The results in Table 5 and Table 7 show that compared with catalyst DC1 prepared in Comparative Example 5, catalyst C1 prepared in Example 9 of the present invention has a significant increase of 1.11% in the total yield of gasoline and liquefied gas, a decrease of 0.16% in the yield of heavy oil, a decrease of 0.97% in the yield of diesel oil, and an increase of 0.65% in the yield of C4 olefins. In the liquefied gas, the concentration of C4 olefins is increased by 2.91%, and the selectivity of C4 olefins is increased by 5.01%. The propylene concentration in liquefied gas experiences little change. Compared with catalyst DC1-1 prepared according to Comparative Example 5', catalyst C1 prepared in Example 9 of the present invention has a significant increase of 1.27% in the total yield of gasoline and liquefied gas, a decrease of 0.14% in the yield of heavy oil, a decrease of 1.14% in the yield of diesel oil, and an increase of 0.67% in the yield of C4 olefins. In the liquefied gas, the concentration of C4 olefins is increased by 2.95%, and the selectivity of C4 olefins is increased by 5.17%. The propylene concentration in liquefied gas experiences little change. It indicates that adjusting the pH of the slurry with dilute ammonia water in the present invention enables the precipitation of the zirconium-containing compound on the surface of the β zeolite, and the modified β zeolite prepared has higher activity and ability of cracking heavy oil, and has excellent yield and selectivity of C4 olefins.

Compared with catalyst DC2 prepared in Comparative Example 6, catalyst C2 prepared in Example 10 of the present invention has a significant increase of 1.41% in the total yield of gasoline and liquefied gas, a decrease of 0.59% in the yield of heavy oil, a decrease of 1.31% in the yield of diesel oil, and an increase of 0.87% in the yield of C4 olefins. In the liquefied gas, the concentration of C4 olefins is increased by 4.61%, and the selectivity of C4 olefins is increased by 7.15%. The propylene concentration in liquefied gas experiences little change. Compared with catalyst DC2-1 prepared according to Comparative Example 6', catalyst C2 prepared in Example 10 of the present invention has a significant increase of 1.44% in the total yield of gasoline and liquefied gas, a decrease of 0.64% in the yield of heavy oil, a decrease of 1.34% in the yield of diesel oil, and an increase of 0.86% in the yield of C4 olefins. In the liquefied gas, the concentration of C4 olefins is increased by 4.58%, and the selectivity of C4 olefins is increased by 7.1%. The propylene concentration in liquefied gas experiences little change. It indicates that the modified β zeolite prepared using carbon sources in the present invention has higher activity and ability of cracking heavy oil, and has excellent yield and selectivity of C4 olefins.

Compared with catalyst DC3 prepared in Comparative Example 7, catalyst C5 prepared in Example 13 of the present invention has a significant increase of 2.13% in the total yield of gasoline and liquefied gas, a decrease of 0.10% in the yield of heavy oil, a decrease of 2.58% in the yield of diesel oil, and an increase of 0.76% in the yield of C4 olefins. In the liquefied gas, the concentration of C4 olefins is increased by 4.8%, and the selectivity of C4 olefins is increased by 5.81%. The propylene concentration in liquefied gas experiences little change. It indicates that the phosphorus-containing modified β zeolite prepared in the present invention has higher activity and ability of cracking heavy oil, and has excellent yield and selectivity of C4 olefins.

Compared with Comparative Examples 5-8, when the content of modified β zeolite in the catalyst is equivalent, the catalytic cracking catalysts C1-C9 prepared according to Examples 9-16 of the present invention has a higher ability of cracking heavy oil, a lower yield of diesel oil, and a higher yield of C4 olefins. The concentration of C4 olefins in liquefied gas increases under the condition of basically little change in the yield of liquefied gas.

The preferred embodiments of the present invention are described in detail as above. However, the present invention is not limited to the specific details of the above embodiments. Within the scope of the technical concept of the present invention, a variety of simple modifications can be made to the technical solution of the present invention, and these simple modifications are all within the protection scope of the present invention.

Besides, one thing needs to be clarified is that each of the specific technical features described in the above specific embodiments can be combined in any suitable way, if not contradictory. In order to avoid unnecessary repetition, the invention will no longer describe the various possible combination ways.

In addition, the various embodiments of the present invention can also be combined arbitrarily, as long as it does not violate the thought of the present invention. It should also be considered as the content disclosed by the present invention.

The invention claimed is:

1. A modified β zeolite, comprising 0.5-15 wt % of an IVB group metal element in terms of oxide on a dry basis weight of the modified β zeolite, an amount of medium strong acid centers of the modified β zeolite accounting for 30-60% of a total acid amount, an amount of strong acid centers accounting for 5-25% of the total acid amount, a ratio of B acid to L acid being 0.8 or more, a ratio of a weight of the IVB group metal element in a modified β zeolite body phase to a weight of the IVB group metal element on a surface being 0.1-0.8.

2. The modified β zeolite according to claim 1, wherein the ratio of the B acid to the L acid is 1.0-1.5.

3. The modified β zeolite according to claim 1, wherein the amount of the medium strong acid centers accounts for 35-55% of the total acid amount.

4. The modified β zeolite according to claim 1, wherein the amount of the strong acid centers accounts for 5-20% of the total acid amount.

5. The modified β zeolite according to claim 1, wherein the modified β zeolite comprises 1-12 wt % of the IVB group metal element in terms of oxide on the dry basis weight of the modified β zeolite.

6. The modified β zeolite according to claim 1, wherein the IVB group metal element is Zr and/or Ti, wherein the weight of the Zr element is based on $ZrO_2$, and the weight of the Ti element is based on $TiO_2$.

7. The modified β zeolite according to claim 1, wherein the ratio of the weight of the IVB group metal element in the modified β zeolite body phase to the weight of the IVB group metal element on the surface is 0.1-0.6.

8. A catalytic cracking catalyst, comprising 10-50 wt %, of Y-type zeolite, 2-40 wt % of a modified β zeolite, 10-70 wt % of clay, and 5-60 wt % of a heat-resistant inorganic oxide on a dry basis weight of the catalytic cracking catalyst, wherein the modified β zeolite is the modified β zeolite according to claim 1.

9. The catalytic cracking catalyst according to claim 8, wherein the Y-type zeolite is selected from one or more of a Y-type zeolite containing phosphorus and/or rare earth, an ultrastable Y zeolite and an ultrastable Y zeolite containing phosphorus and/or rare earth;
the clay is selected from one or more of kaolin, rectorite, diatomite, montmorillonite, bentonite and sepiolite; and/or
the heat-resistant inorganic oxide is selected from one or more of aluminum oxide, silicon oxide and amorphous silicon aluminum.

10. The catalytic cracking catalyst according to claim 8, wherein the catalytic cracking catalyst comprises 15-45 wt %, of the Y-type zeolite, 5-30 wt % of the modified β zeolite, 10-50 wt % of the clay and 5-40 wt % of the heat-resistant inorganic oxide.

11. A method for preparing the modified β zeolite according to claim 1, comprising:
(1) mixing a compound containing a IVB group metal, a carbon source and a first solvent to form a first mixture, adjusting a pH value of the mixture to 4-9 to give a first slurry, wherein the carbon source comprises a native macromolecular organic compound and/or a semi-synthetic macromolecular organic compound; and (2) mixing the first slurry and a β zeolite by stirring at 20-100° C. for 10-180 min to form a second mixture, separating a solid from the second mixture, and carrying out a first calcination at 350-650° C. for 0.5-5 hr.

12. The method according to claim 11, wherein the pH value of the first slurry is adjusted to 5-8 in step (2).

13. The method according to claim 11, wherein the weight ratio of the compound containing the IVB group metal and the β zeolite is (0.005-0.15): 1, and the weight ratio of the β zeolite and the carbon source is 1:(0.001–0.15), wherein the compound containing the IVB group metal is based on the oxide of the IVB group metal, and the β zeolite is on a dry basis weight.

14. The method according to claim 11, wherein the β zeolite is selected from one or more of hydrogen type β zeolite, sodium type β zeolite, β zeolite containing phosphorous, β zeolite containing a rare earth metal and β zeolite containing phosphorus and a rare earth metal;

the carbon source is selected from one or more of starch, lignin, viscose fiber, methyl cellulose, hydroxypropyl methyl cellulose, hydroxyethyl cellulose and carboxymethyl cellulose; the compound containing the IVB group metal is selected from one or more of zirconium tetrachloride, zirconium acetate, zirconium isopropoxide, titanium tetrachloride, titanium oxysulfate, ammonium fluotitanate, zirconium sulfate, zirconium nitrate, zirconium oxychloride, titanium sulfate, tetrabutyl titanate, titanium trichloride and titanous sulfate; and/or the first solvent is selected from one or more of deionized water, ethanol, acetone and n-hexane.

15. A method for preparing a catalytic cracking catalyst, comprising:

mixing a Y-type zeolite, the modified β zeolite according to claim 1, a clay, a heat-resistant inorganic oxide and a second solvent to give a second slurry, granulating the second slurry obtained, and carrying out drying and/or a second calcination.

16. The method according to claim 15, wherein the drying is carried out at 80-200° C., for 0.5-24 hr, and the second calcination is carried out at 350-700° C. for 0.5-5 hr.

17. A method for catalytic cracking of heavy oils, comprising:

preparing a catalytic cracking catalyst comprising the modified β zeolite according claim 1; and contacting a heavy oil with the catalytic cracking catalyst under catalytic cracking conditions.

18. A method for catalytic cracking of heavy oils, comprising:

preparing the catalytic cracking catalyst according claim 8; and contacting a heavy oil with the catalytic cracking catalyst under catalytic cracking conditions.

\* \* \* \* \*